(12) United States Patent
Galea et al.

(10) Patent No.: US 12,292,133 B2
(45) Date of Patent: May 6, 2025

(54) ROTARY ACTUATOR

(71) Applicant: Methode Electronics Malta Ltd., Birkirkara (MT)

(72) Inventors: Alexander Galea, Dingli (MT); Matthew Spiteri, Zejtun (MT)

(73) Assignee: Methode Electronics Malta Ltd., Birkirkara (MT)

( * ) Notice: Subject to any disclaimer, the term of this patent is extended or adjusted under 35 U.S.C. 154(b) by 0 days.

(21) Appl. No.: 18/115,072

(22) Filed: Feb. 28, 2023

(65) Prior Publication Data

US 2023/0287987 A1    Sep. 14, 2023

(30) Foreign Application Priority Data

Mar. 8, 2022 (DE) .......................... 102022105417.9

(51) Int. Cl.
*F16K 31/04* (2006.01)

(52) U.S. Cl.
CPC ...... *F16K 31/042* (2013.01); *F16K 2200/302* (2021.08)

(58) Field of Classification Search
None
See application file for complete search history.

(56) References Cited

U.S. PATENT DOCUMENTS

| | | | |
|---|---|---|---|
| 8,360,393 B2 * | 1/2013 | Park | F16K 31/53 251/71 |
| 9,683,906 B2 | 6/2017 | Gießibl | |
| 10,024,456 B2 | 7/2018 | Lueders et al. | |
| 10,488,278 B2 | 11/2019 | Gießibl | |
| 10,760,657 B2 * | 9/2020 | Heiraas | F16H 1/28 |
| 11,150,684 B2 | 10/2021 | Spiteri | |
| 11,442,489 B2 | 9/2022 | Bonnici et al. | |
| 11,561,141 B2 | 1/2023 | Gießibl | |
| 2017/0102279 A1 | 4/2017 | Gießibl | |
| 2022/0107232 A1 | 4/2022 | Gießibl et al. | |
| 2023/0040496 A1 | 2/2023 | Gießibl et al. | |

FOREIGN PATENT DOCUMENTS

| | | |
|---|---|---|
| JP | 3563438 B2 * | 9/2004 |
| WO | 2021140006 A1 | 7/2021 |

OTHER PUBLICATIONS

Co-pending U.S. Appl. No. 18/115,128, filed Feb. 28, 2023.
Co-pending U.S. Appl. No. 18/138,174, filed Apr. 24, 2023.

\* cited by examiner

*Primary Examiner* — Angelisa L. Hicks
(74) *Attorney, Agent, or Firm* — Greenberg Traurig, LLP

(57) ABSTRACT

A rotary actuator is connected to a device and configured to set the device in a motion. The rotary actuator has a rotary actuation system and a logic. The logic is configured such that when a movement is applied to the device independent of the rotary actuator, the logic activates the rotary actuator to: (i) move the device to at least one functional position or (ii) move the device to a starting position.

11 Claims, 2 Drawing Sheets

ROTARY ACTUATOR

RELATED APPLICATION DATA

This application claims priority benefit to German Patent Application Ser. No. DE 10 2022 105 417.9 filed on Mar. 8, 2022, the disclosure of which is incorporated by reference herein.

BACKGROUND AND SUMMARY

The invention relates to a rotary actuator which is connected to a device to set the device in a motion.

The EP 3 094 840 B1 reveals a rotary valve arrangement having an adjustment system. The adjustment system comprises a drive wheel provided with a drive wheel toothing. The drive wheel is rotatable around a first axis of rotation in order to drive a driven wheel. The driven wheel is provided with a driven wheel toothing. By a rotation of the drive wheel the driven wheel can be adjusted from a first rotational position into an arresting position. In the arresting position the driven wheel is held in the event of a further rotation of the drive wheel.

Previously known rotary actuators often do not prevent damage done to the rotary actuator as well as to its components arranged inside of the rotary actuator. The damage may happen, should the device be subjected to an unintended use or movement.

The problem is solved by a rotary actuator as set forth herin.

As described below, the exemplary rotary actuator comprises a rotary actuation system. The rotary actuator further comprises a logic. When a movement is applied to the device independently of the rotary actuator the logic either activates the rotary actuator to move the device to a functional position. Alternatively, the logic activates the rotary actuator to move the device to a starting position.

Rotary Actuator

The rotary actuator is presented as a part of a machine. The rotary actuator causes a device or an arm to perform a physical movement.

The physical movement of the device or the arm is performed by converting energy into a mechanical force. The converted energy may be an electrical energy or air or a hydraulic energy.

In other words, the rotary actuator is a component of a machine which enables the movement of the machine.

The rotary actuator requires a source of energy and a control signal. When the rotary actuator receives the control signal, the rotary actuator responds to the control signal by converting the energy provided by a source of energy into a mechanical motion.

Preferably, the source of energy provides an electrical current or hydraulic pressure or pneumatic pressure to the rotary actuator.

The actuator is called rotary actuator because it triggers a circular movement of an object, preferably of a device or an arm, around at least one axis of rotation.

The rotary actuator is used to rotate a device and/or an arm. The device or arm which is supposed to be rotated can be used to open and/or close a valve or a louver or a flap. It goes without saying that any other object can also be set in motion or opened or closed by the rotary actuator.

By way of example, but in no way exclusively, it is assumed that the object rotated by the rotary actuator is a device or an arm.

The rotary actuator can be linked with or connected to the device and/or to the arm in any technical manner.

There may also be a clutch fitted between the rotary actuator and the device or the arm.

As set forth herein, the device or the arm may be a mechanical device which comprises at least one stationary part of a motor or a generator in which or around which the rotary actuator revolves.

Unstable Rotary Actuation System

A rotary actuation system may be referred to as stable, if the system always returns to and/or stays near a predefined state.

The rotary actuation system is referred to as unstable, if the system continues to move away from the stable state referred to above.

A rotary actuation system also comprises elements of a control system. The elements of the control system are responsible for transforming the output of a control system into a controlling action on a machine or a device.

In other words, the rotary actuator is a mechanism which is acted upon by a control system to perform an operation or a task.

The control system of the rotary actuator may be software-based. The control system may also be a fixed mechanical or an electronic system. The control system of the rotary actuator may alternatively be an automated control system. It goes without saying that the control system of the rotary actuator can be designed in any other technical way.

Unintended Manipulation of the Device or the Arm

A so-called unintended use may include use of the device that was not set in motion by the rotary actuator. The unintended use may also be an unintentional movement applied to the device. For the sake of simplicity, in the following an unintended use is assumed.

Should a device be manipulated unintentionally, it is possible that the rotary actuator and/or a mechanism inside the rotary actuator might get damaged. This is the case when the rotary actuator is fixed directly to the device.

In case where a clutching mechanism is installed between the rotary actuator and the device, the clutching mechanism will not allow damage to be done to the rotary actuator. In the following, the clutching mechanism will be referred to as a clutch.

However, when the clutch is arranged and the device has been manipulated, the device will be rotated out of its starting position, to which the rotary actuator has set the device.

As referred to in more detail below, the device, which is rotated by the rotary actuator, can be manipulated unintentionally.

The device or the arm is rotated by the rotary actuator. To allow the rotation of the device or the arm, the device or the arm is connected to or attached to the rotary actuator.

Alternatively, the clutch may be provided between the device or the arm and the rotary actuator.

If the device or arm is moved unintentionally in its connection with the rotary actuator, the rotary actuator as such can be damaged.

However, if the clutch is positioned between the device or the arm and the rotary actuator, the clutch itself can be damaged. Should the device or arm be moved unintentionally, the rotary actuator is protected from any further mechanical damage by the interposed clutch.

However, the arrangement of the clutch between the device or the arm and the rotary actuator causes the device or the arm to be moved out of its starting position relative to the rotary actuator, when the device or arm has been moved or used unintentionally.

In other words, the unintentional use or the unintentional movement of the device or arm takes place, when a use or a movement is applied to the device or to the arm, independently of the rotary actuator. The unintentional use or movement of the device or the arm has not been triggered by the rotary actuator.

The logic either activates the rotary actuator to move the device to a functional position. Alternatively, the logic activates the rotary actuator to move the device to a starting position The starting position is the position which the device or arm assumes before the device or arm can be transferred to a functional position.

The functional position is one of several positions in which the device or arm performs one of several functions.

The starting position of the device or the arm is the position of the device or the arm relative to the rotary actuator, necessary for the transfer of the device or arm to the functional position.

Thus, the unintentional movement or use of the device or arm in relation to the rotary actuator is a movement or use of the device or the arm that transfers the device or the arm into a position outside the starting position and/or outside the functional position.

Also, when moved or used unintentionally, the device or the arm is transferred into a position which is neither a starting position nor a functional position. The unintentional use or the unintentional movement has been exerted on the device or on the arm in a way that is detached from the rotary actuator.

Clutch

The clutch may include a mechanical device which engages and disengages a power transmission. The engagement and the disengagement of the power may take place from a drive shaft and/or a driving shaft to a driven shaft.

As explained above, the clutch prevents a mechanical damage to the rotary actuator when an unintentional use or movement is applied to the device or the arm.

The damage is prevented when the device or the arm is mechanically and/or functionally connected to the rotary actuator and at the same time the device or arm is unintentionally used or moved relative to the rotary actuator.

When a clutch is provided, the unintentional movement of the device or the arm relative to the rotary actuator causes a displacement of the device or the arm out of the corresponding starting position.

Rotary Sensing Device

The sensing device may include a sensor.

The sensor responds to a physical stimulus. The sensor converts the physical stimulus into a signal to be conveyed to another object.

Spring and Barrel

The spring may include an elastic object which is able to store mechanical energy.

The spring may be made of spring steel. It goes without saying that the spring can also be manufactured from other materials.

There is a variety of spring designs. In everyday use, the term spring is often referred to a coil spring.

By way of example, in the following, the invention relates to a torsion spring. The torsion spring is a spring which works by twisting the end of the spring along an axis.

The torsion spring is a flexible elastic object storing mechanical energy when the torsion spring is twisted.

When the torsion spring is twisted, the torsion spring exerts a torque in the opposite direction, proportional to the amount and/or proportional to the angle the torsion spring is twisted.

The torsion spring may be twisted in opposite directions or in the same direction. In other words, the torsion spring may be twisted clockwise or anti-clockwise.

The unstable rotary device comprises at least one torsion spring and a set of barrels.

The at least one barrel houses at least one torsion spring.

At least two barrels lock against each other, depending on the direction of the rotation necessary to activate the at least one torsion spring to allow the rotary actuation system work as intended by the invention.

DESCRIPTION OF THE DRAWINGS

Further examples and embodiments of the invention are described in more detail with reference to the drawing.

DETAILED DESCRIPTION

Figure 1:
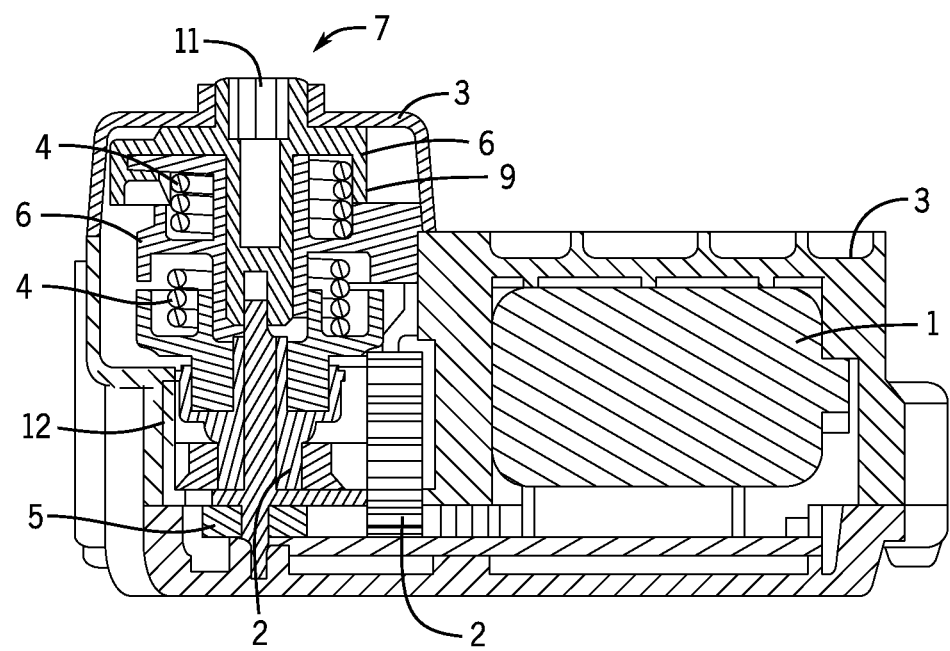
FIG. 1 shows a side view of a rotary actuator.

FIG. 1 shows an unstable rotary actuation system 1 comprising a gear train 2 arranged in an enclosure 3.

FIG. 1 shows the side view of the rotary actuator 7, comprising an unstable rotary actuation system 9, 4, 6 inside an enclosure 3.

Inside the enclosure 3 of the rotary actuator 7 one can see a motor 1 and the gear train 2.

The motor 1 interacts with the gear train 2 of the rotary actuator 7.

The unstable rotary actuation system 9 comprises at least one torsion spring 4. The unstable rotary actuation system 9 further comprises at least one barrel 6.

Both the torsion spring 4 and the barrel 6 are arranged within the enclosure 3 of the rotary actuator 7.

Providing the at least one torsion spring 4 and the barrel 6, the unstable rotary actuation system 9 prevents the occurrence of damage towards the rotary actuator 7.

The rotary actuation system 9, 6, 4 which is attached to the rotary actuator 7, prevents damage to the rotary actuator 7, given the case that the device or arm 8 (not shown) is subject to unintended use.

When the device or arm 8 (not shown in FIG. 1) which is mounted to the rotary actuator 7 via the flange 11 is subject to an unintentional use or movement, the unstable rotary actuation system 9, 6, 4 moves a rotary sensing device 5 without exerting excessive and/or damaging force to the motor 1 and/or to the gear train 2.

The rotary actuator 7 further comprises a logic 12. When a movement is applied to the device or to the arm 8, independently of the rotary actuator 7, the logic 12 either activates the rotary actuator 7 to move the device 8 to a functional position (not shown). Alternatively, the logic 12 activates the rotary actuator 7 to move the device or the arm 8 to a starting position 13.

The unstable rotary actuation system 9 works in both the clockwise direction and in the anti-clockwise direction.

The unstable rotary actuation system 9 comprises the torsion spring 4.

The unstable rotary actuation system 9 also comprises barrels 6.

The two barrels 6 lock against each other to activate at least one of the torsion springs 4.

Figure 2:
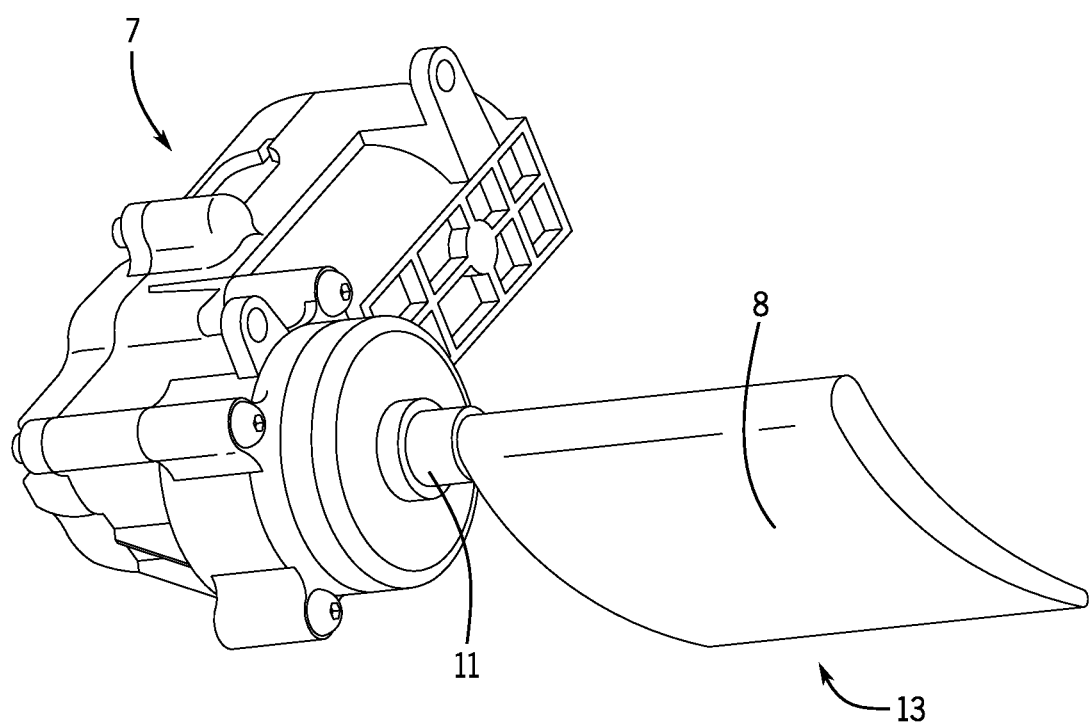
FIG. 2 shows a rotary actuator connected to a device or an arm.

The FIG. 2 shows a rotary actuator 7. Via the flanch 11, the device or the arm 8 is mounted to the rotary actuator 7. The device or the arm 8 is shown in a starting position 13.

Figure 3:
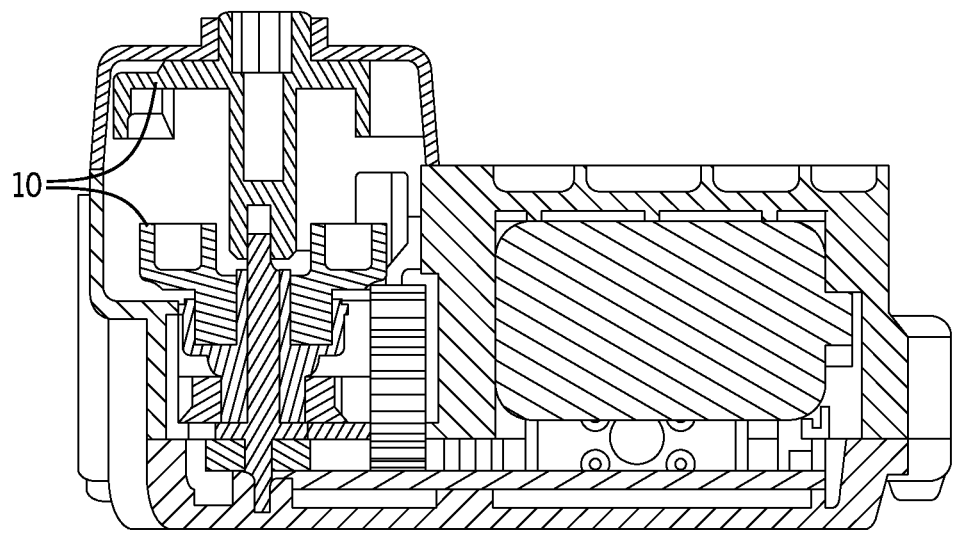
FIG. 3 shows a rotary actuator comprising a clutch.

The FIG. 3 shows a rotary actuator 7 similar to the rotary actuator 7 shown in the FIG. 1. However, in the interior of the rotary actuator 7 a clutch 10 is shown.

LIST OF REFERENCE 1 motor
2 gear train
3 enclosure
4 torsion spring
5 rotary sensor
6 barrel
7 rotary actuator
8 device/arm
9 unstable rotary actuation system
10 clutch
11 flanch
12 logic
13 starting position

The invention claimed is:

1. A rotary actuator connected to a device, the rotary actuator being adapted and configured to set the device into motion, the rotary actuator comprising:

a rotary actuation system and a logic, wherein the logic is adapted and configured in a manner such that when a movement is applied to the device independent of the rotary actuator to a position outside a starting position or at least one functional position, the logic activates the rotary actuator to at least one of: (i) move the device to the at least one functional position, or (ii) move the device to the starting position.

2. The rotary actuator according to claim 1, wherein the device is moved to one of at least two functional positions.

3. The rotary actuator according to claim 1, wherein the rotary actuation system comprises at least one spring.

4. The rotary actuator according to claim 1, wherein the rotary actuation system comprises at least one barrel.

5. The rotary actuator according to claim 4, wherein the barrel houses at least one spring.

6. The rotary actuator according to claim 4, wherein the barrel connects the device to a gear train.

7. The rotary actuator according to claim 4, wherein the barrel connects the device to the rotary sensor.

8. The rotary actuator according to claim 1, wherein the rotary actuation system comprises at least one spring and at least two barrels, and the at least two barrels lock against each other to activate one of the springs based upon on the direction of rotation of the device.

9. The rotary actuator according to claim 1, wherein the rotary actuation system is enabled to move a rotary sensor.

10. The rotary actuator according to claim 1, wherein the movement comprises an unintentional movement applied to the device that was not triggered by the rotary actuator.

11. The rotary actuator according to claim 1, wherein the logic activates the rotary actuator to move to device to protect the rotary actuator from damage.

* * * * *